United States Patent [19]

Elmqvist

[11] 4,279,965

[45] Jul. 21, 1981

[54] BLANK PIPE FOR MANUFACTURE

[76] Inventor: Orvar Elmqvist, Bodalsvägen 4,, 141 36 Lidingö, Sweden

[21] Appl. No.: 24,653

[22] PCT Filed: Jul. 17, 1978

[86] PCT No.: PCT/SE78/00023

§ 371 Date: Apr. 2, 1979

§ 102(e) Date: Mar. 15, 1979

[87] PCT Pub. No.: WO79/00079

PCT Pub. Date: Feb. 22, 1979

[51] Int. Cl.³ .......................... F16L 9/16; F16L 11/16
[52] U.S. Cl. .................................. 428/582; 428/592; 138/154
[58] Field of Search ................. 428/582, 592; 138/154

[56] References Cited

U.S. PATENT DOCUMENTS

| | | | |
|---|---|---|---|
| 1,761,034 | 6/1930 | Gillett | 138/154 |
| 3,352,649 | 11/1967 | Tennison, Jr. | 428/592 |
| 3,495,628 | 2/1970 | Boender | 138/154 |
| 4,161,194 | 7/1979 | Nyssen | 138/154 |

FOREIGN PATENT DOCUMENTS

| | | |
|---|---|---|
| 2321553 | 3/1974 | Fed. Rep. of Germany . |
| 89121 | 2/1957 | Norway . |
| 346082 | 10/1972 | Sweden . |

*Primary Examiner*—Brooks H. Hunt
*Attorney, Agent, or Firm*—LeBlanc, Nolan, Shur & Nies

[57] ABSTRACT

Blank for pipe manufacture, intended to be wound helically so that a joint is formed between adjacent turns in the helically wound blank thereby, that a portion on the lateral edge (11) of the blank in a turn is fitted into a portion of the remaining lateral edge (12) of the blank in an adjacent turn.

A portion (13) located between said two portions on the lateral edges of the blank has an outward bulge enclosing a cavity. Said bulge is of such a shape that the surface (18) of the cavity enclosed in a section through the transverse direction of the blank is substantially greater than the surface (21) in said section between the two adjacent edges (19,20) on the blank, which are the places of attachment for the bulge. The surface (18) of the cavity further includes distances (22) in said section substantially in parallel with the transverse direction of the wall blank, which distances are substantially longer than the distance (21) between said adjacent edges (19,20) on the blank.

When forming a pipe of the blank, the bulge is located on the outside of the completed pipe. The bulge has the twofold object of providing a pipe formed of the blank with the function of an elastic bellows, in order to reduce stresses at movements of the pipe, and of rendering the pipe more rigid against compression.

3 Claims, 1 Drawing Figure

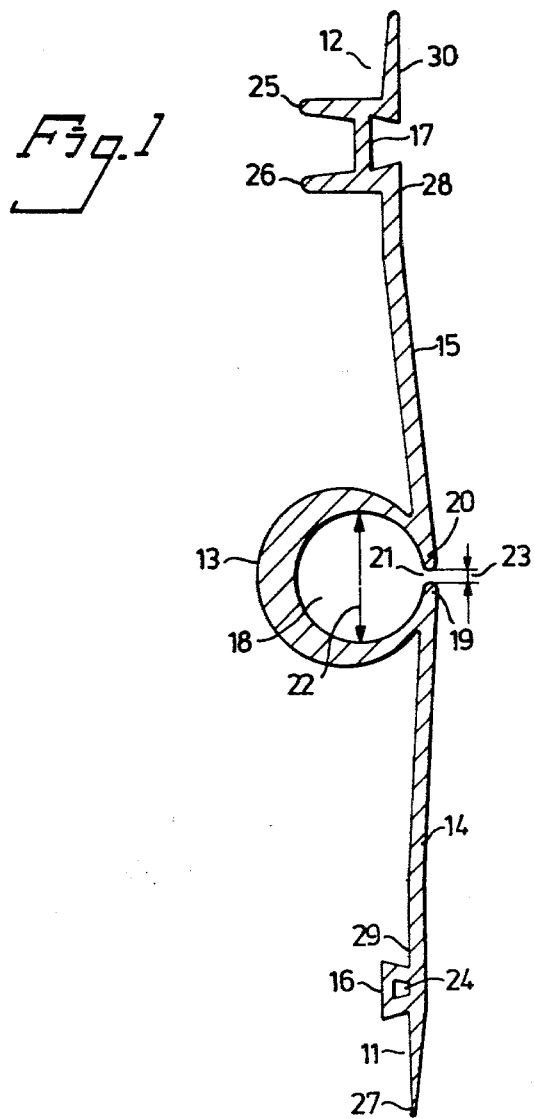

BLANK PIPE FOR MANUFACTURE

This invention relates to a blank for pipe manufacture and has the object of producing a pipe blank adapted for continuous pipe manufacture in connection with immediate laying of the pipe, for example in the sea on great depth.

It has been tried since a long time ago to sink welded sheet metal pipes of substantial length and diameter (500 m and, respectively, 2 m) in order to reach cold deep water. These efforts, however, have proved to involve enormous difficulties with respect to the manufacture proper of pipes of such length on land, to towing the pipes and sinking them into the sea, and to attaching the pipes to a movable pontoon. When pipes of such length and weight by water currents are forced to move in vertical direction, very high stresses arise in the attachments. These difficulties are eliminated by manufacturing a pipe blank according to the invention and by manufacturing pipes of said pipe blank in the place where the pipe is planned to be laid.

A pipe blank according to the invention is designed so that it is possible in immediately consecutive steps to extrude the pipe blank, to roll the pipe blank to a pipe with a diameter within a wide diameter range, to attach adjacent turns comprised in the pipe to each other and to lay the pipe thus manufactured into position in lakes, the sea or in earth on land.

The characterizing features of a pipe blank according to the invention become apparent from the attached claims. The invention is described in greater detail in the following, with reference to the accompanying drawing, which is a schematic section through a pipe blank according to the invention.

The pipe blank shown in the drawing consists of a first lateral edge 11, a second lateral edge 12, a central portion 13 located between said two lateral edges, a first plane wall portion 14 jointing said first lateral edge 11 and said central portion 13, and a second plane wall portion 15 jointing said second lateral edge 12 and said central portion 13. The lateral edge 11 is formed with a trapezoid outward bulge 16, and the lateral edge 12 is formed with an inward bulge 17 corresponding to the outward bulge 16. The pipe blank is intended to be wound helically so that a joint is formed between adjacent turns in the helically wound pipe thereby, that the outward bulge 16 in a turn is fitted into the inward bulge 17 in an adjacent turn. Said central portion 13 has an outward bulge of such configuration, that the surface 18 enclosing the bulge is substantially greater than the surface 21 between the two adjacent edges 19,20 on the blank, which edges constitute the places of attachment of the bulge. The surface 18 enclosing the bulge further includes distances, for example, the distance 22, approximately in parallel with the transverse direction of the wall blank, which distances are substantially longer than the distance 23 between the adjacent edges 19,20 on the blank.

The blank shown in the drawing by way of example has an outward bulge in the central portion 13 of substantially circular shape. Said bulge will be located on the outside of the completed pipe. Said bulge has the twofold object of providing the pipe with an elastic "bellows" function in order to reduce the stresses arising by the effect of wave movements on the pontoon, to which the pipe is attached, and of rendering the pipe more rigid against compression. The detail design of the bulge depends on the strength properties of the pipe material and on the "bellows" function, which the pipe can be imagined to suitably carry out in individual cases. The inside of the pipe is desired to be as smooth as possible in order to permit the highest possible degree of laminar flow through the pipe. In the embodiment shown in the drawing the ratio between the surface 18 enclosed by the bulge and the surface 21 between the edges 19,20 is about 50:1. The ratio between the longest distance within the bulge in parallel with the transverse direction of the wall blank, i.e. the diameter, and the shortest distance 23 between the adjacent edges 19,20 is about 15:1.

As material in the blank polythene plastics, for example, can be chosen. A pipe made only of polythene plastics is lighter than water, and therefore the plastic material for pipes to be laid on great depth in the sea preferably should be admixed with some kind of filler material, for example soot, graphite, talc or the like, in order to suitably adjust the weight of the completed pipe to the weight of the ambient water. A suitable material composition may be about 7 parts of polythene and 1 part of graphite, yielding a mass having substantially the same density as sea water.

As appears from the drawing, the bulge 16 is formed with a cavity 24, and the lateral edge 12 is provided with two horns 25,26 in immediate connection to the inward bulge 17. By means of special members, for example rollers, on the machine, which forms the blank to a pipe, it is easy to somewhat compress the outward bulge 16 and to cause the horns 25,26 to slightly approach each other during the moment when a new turn in the pipe is to be attached to the nearest adjacent turn in the pipe. The horns 25,26 like the bulge of the central portion 13 also have a stiffening effect and counteract compression of the pipe. When forming the pipe, the surface 27 of the lateral edge 11, which surface is located on the same side as the outward bulge 16, is welded to the surface 28 of the lateral edge 12, which surface is located on the same side as the inward bulge 17, and the surface 29 of the lateral edge 11, which surface is located closer to the central portion 13 than the surface 27, is welded to the surface 30 of the lateral edge 12, which surface is located farther away from the central portion 13 than the surface 28. The completed pipe, thus, shows continuous welding joints on both sides of the continuous place of attachment 16-17.

I claim

1. A blank for pipe manufacture, intended to be wound helically so that a joint is formed between adjacent turns in the helically wound blank thereby, that a portion on one lateral edge (11) on the blank in a turn is fitted into a portion on the remaining lateral edge (12) of the blank in an adjacent turn, characterized in that a portion (13) located between said two portions on the lateral edges of the blank has a bulge, which encloses a cavity and has such configuration, that the cross-section area (18) of the cavity enclosed by the bulge in a section through the transverse direction of the blank is substantially greater than the cross-section area (21) in said section between the two adjacent edges (19,20) on the blank, which edges constitute the places of attachment of the bulge, and that the cross-section area (18) of the cavity enclosed by the bulge includes distances in said section substantially in parallel with the transverse direction of the wall blank, which distances (for example 22) are substantially longer than the distance (21) between said adjacent edges (19,20) on the blank.

2. A blank according to claim 1, characterized in that the ratio between said cross-section area (18) of the cavity enclosed by the bulge and the cross-section area between the two adjacent edges (19,20) is about 50:1, and the ratio between the longest distance (21) in parallel with the transverse direction of the wall blank in the cross-section area of said cavity enclosed by the bulge and the shortest distance between said adjacent edges (19,20) on the wall blank is about 15:1.

3. A blank according to claim 1 or 2, characterized in that the bulge has a substantially circular shape in cross-section.

* * * * *